(12) United States Patent
Horiuchi

(10) Patent No.: US 8,596,318 B2
(45) Date of Patent: Dec. 3, 2013

(54) PNEUMATIC TIRE WITH TREAD INCLUDING CIRCUMFERENTIAL GROOVES HAVING INCLINED FINE GROOVES

(75) Inventor: Kenji Horiuchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 815 days.

(21) Appl. No.: 12/466,146

(22) Filed: May 14, 2009

(65) Prior Publication Data

US 2009/0294003 A1    Dec. 3, 2009

(30) Foreign Application Priority Data

Jun. 2, 2008    (JP) .................. 2008-144277

(51) Int. Cl.
*B60C 11/12* (2006.01)
*B60C 11/13* (2006.01)

(52) U.S. Cl.
USPC ............ 152/209.18; 152/209.21; 152/DIG. 3

(58) Field of Classification Search
USPC ............ 152/209.18, 209.21, 209.22, 209.23, 152/DIG. 3
See application file for complete search history.

(56) References Cited

U.S. PATENT DOCUMENTS

| | | | | | |
|---|---|---|---|---|---|
| 2,268,344 | A | * | 12/1941 | Shesterkin | 152/209.18 |
| 3,550,665 | A | * | 12/1970 | Verdier | 152/209.18 |
| 4,298,046 | A | * | 11/1981 | Herbelleau et al. | 152/209.23 |
| 4,449,560 | A | * | 5/1984 | Tansei et al. | 152/209.23 |
| 5,679,186 | A | * | 10/1997 | Tagashira et al. | 152/209.23 |
| 6,196,288 | B1 | * | 3/2001 | Radulescu et al. | 152/209.17 |
| 6,415,835 | B1 | * | 7/2002 | Heinen | 152/209.21 |
| 6,435,237 | B1 | * | 8/2002 | Elkurd et al. | 152/209.3 |
| 6,571,844 | B1 | * | 6/2003 | Ochi et al. | 152/209.18 |
| 7,004,216 | B2 | * | 2/2006 | Godefroid | 152/209.18 |
| 7,537,033 | B2 | * | 5/2009 | Yamane | 152/209.21 |
| 2001/0032691 | A1 | * | 10/2001 | Ohsawa | 152/209.18 |
| 2006/0032566 | A1 | * | 2/2006 | Koya | 152/209.18 |

FOREIGN PATENT DOCUMENTS

| | | | |
|---|---|---|---|
| EP | 0602989 | * | 6/1994 |
| JP | 05-000605 | * | 1/1993 |
| JP | 2005-297698 | * | 10/2005 |
| JP | A 2006-137239 | | 6/2006 |

* cited by examiner

*Primary Examiner* — Steven D Maki
*Assistant Examiner* — Robert Dye
(74) *Attorney, Agent, or Firm* — Greer, Burns & Crain, Ltd.

(57) ABSTRACT

Provided is a pneumatic tire having a tread surface in which two circumferential direction main grooves continuous in a tire circumferential direction are arranged on left and right sides of a tire center, and land portions are defined by the circumferential direction main grooves as ribs or blocks having lug grooves. Multiple fine grooves are provided in each of right and left walls of the circumferential direction main groove, the fine grooves being inclined to the tire circumferential direction and provided in regions along the circumferential direction main groove, covering at least 50% of the entire circumference thereof in total. In each of the two circumferential direction main grooves on corresponding tire shoulder sides, the fine grooves in the right and left walls are inclined to the tire circumferential direction in the same direction in a plan view in a tire radial direction. In each of the two circumferential direction main grooves on a tire center side, the fine grooves in the right wall and those in the left wall are inclined to the tire circumferential direction in directions opposite to each other in a plan view in the tire radial direction.

9 Claims, 3 Drawing Sheets

(a)

(b)

(a)

(b)

PNEUMATIC TIRE WITH TREAD INCLUDING CIRCUMFERENTIAL GROOVES HAVING INCLINED FINE GROOVES

BACKGROUND OF THE INVENTION

1. Field of the Invention

The present invention relates to a pneumatic tire, especially to a mud and snow type pneumatic tire which has improved driving and braking performances in running on mud and snow without increasing a lug groove area.

2. Description of the Prior Art

Conventionally, many of the tires classified as a mud and snow type employ a tread pattern including four circumferential direction main grooves provided in the tread surface, so that land portions are defined by the circumferential direction main grooves. The land portions are formed as ribs or blocks having lug grooves. Such tread pattern causes the tire to exhibit high braking and driving performance in running on mud and snow, and thereby to have excellent off-road performance.

It is said that the off-road performance can be effectively improved by increasing the lug groove component in the ribs or the blocks of the above tread pattern.

However, there is a recent demand for recreational vehicles (RV) and the like to have favorable driving stability not only in off-road running but in on-road running. In response to such demand, some tires have increased lug groove component in the ribs or the blocks of the above tread pattern. However, such increase lowers stiffness of the ribs or of the blocks, leading to low driving stability in on-road running.

Japanese patent application Kokai publication No. 2006-137239 proposes a tire designed to have improved braking and driving performance in running on snow without increasing the lug groove component. The tire has the following four circumferential direction main grooves provided in the tread surface: first circumferential direction main grooves provided on a center region and second circumferential direction main grooves provided on respective shoulder regions. The first circumferential direction main grooves are each provided with multiple circumferential direction small grooves extending in the tire circumferential direction in the groove side walls thereof. The second circumferential direction main grooves are each provided with multiple radial direction grooves extending in the tire radial direction in the groove side walls thereof. The circumferential direction small grooves reduce a frictional resistance between water and the groove walls. The radial direction small grooves increase the friction with snow columns formed in the respective grooves when the tire comes into contact with the snowy road surface. Thereby, braking and driving performance in running on snow is improved.

However, the configuration providing only the circumferential direction small grooves and the radial direction small grooves as described above provides limited improvement in the braking and driving performances in running on mud and snow, unless the lug groove component is increased. Accordingly, deterioration in the rib stiffness or the block stiffness cannot be avoided, and this technique is insufficient in achieving a good balance between the braking and driving performance in running on mud and snow as well as the driving stability in on-road running.

SUMMARY OF THE INVENTION

An object of the present invention is to a provide pneumatic tire which overcomes the above problems and achieves a good balance between the braking and driving performance in running on mud and snow as well as the driving stability in on-road running.

A pneumatic tire for achieving the above objective is a pneumatic tire having a tread surface in which two circumferential direction main grooves continuous in a tire circumferential direction are arranged on each of left and right sides of a tire center, and land portions are defined by the circumferential direction main grooves as ribs or blocks having lug grooves. In the pneumatic tire, a large number of fine grooves are provided in each of right and left walls of each of the circumferential direction main grooves, the fine grooves being inclined to the tire circumferential direction and provided in regions along the circumferential direction main groove, covering at least 50% of the entire circumference thereof in total. In each of the two circumferential direction main grooves on tire shoulder sides, the fine grooves in the right wall and the fine grooves in the left wall are inclined to the tire circumferential direction in the same direction in a plan view in a tire radial direction. In each of the two circumferential direction main grooves on a tire center side, the fine grooves in the right wall and the fine grooves in the left wall are inclined to the tire circumferential direction in directions opposite to each other in a plan view in the tire radial direction.

According to the pneumatic tire of the present invention, the four circumferential direction main grooves, each two of which are provided on each side of the tire center, have the following configuration. Each of the two circumferential direction main grooves on the tire center side, which largely contribute to braking performance in running on snow and mud, is provided with the fine grooves in the right and left walls. The fine grooves in the right wall and those in the left wall are inclined in the opposite directions. Thereby, the fine grooves in the right and left groove walls can increase reaction force received from snow or mud and thus improve driving performance. On the other hand, each of the two circumferential direction main grooves on the corresponding tire shoulder side is provided with the fine grooves in the right and left walls. The fine grooves in the right wall and those in the left wall are inclined to the tire circumferential direction in the same direction. Thereby, the fine grooves cause fluids to flow helically in the circumferential direction main grooves. A rectifying effect is thus produced, improving the braking performance. Here, fluid is water or mud on a running surface. The rectifying effect on the fluid causes the draining speed to increase, and the draining effect is thus improved. Thereby, the tire can exhibit higher braking performance.

The pneumatic tire described above can achieve high driving and braking performance on mud and snow, and there is no need to increase the lug groove area any more. Accordingly, the pneumatic tire of the present invention achieves a good balance between the performances on mud and snow as well as the on-road driving stability which would be deteriorated if the lug groove area were increased.

DESCRIPTION OF THE PREFERRED EMBODIMENT

Figure 1:
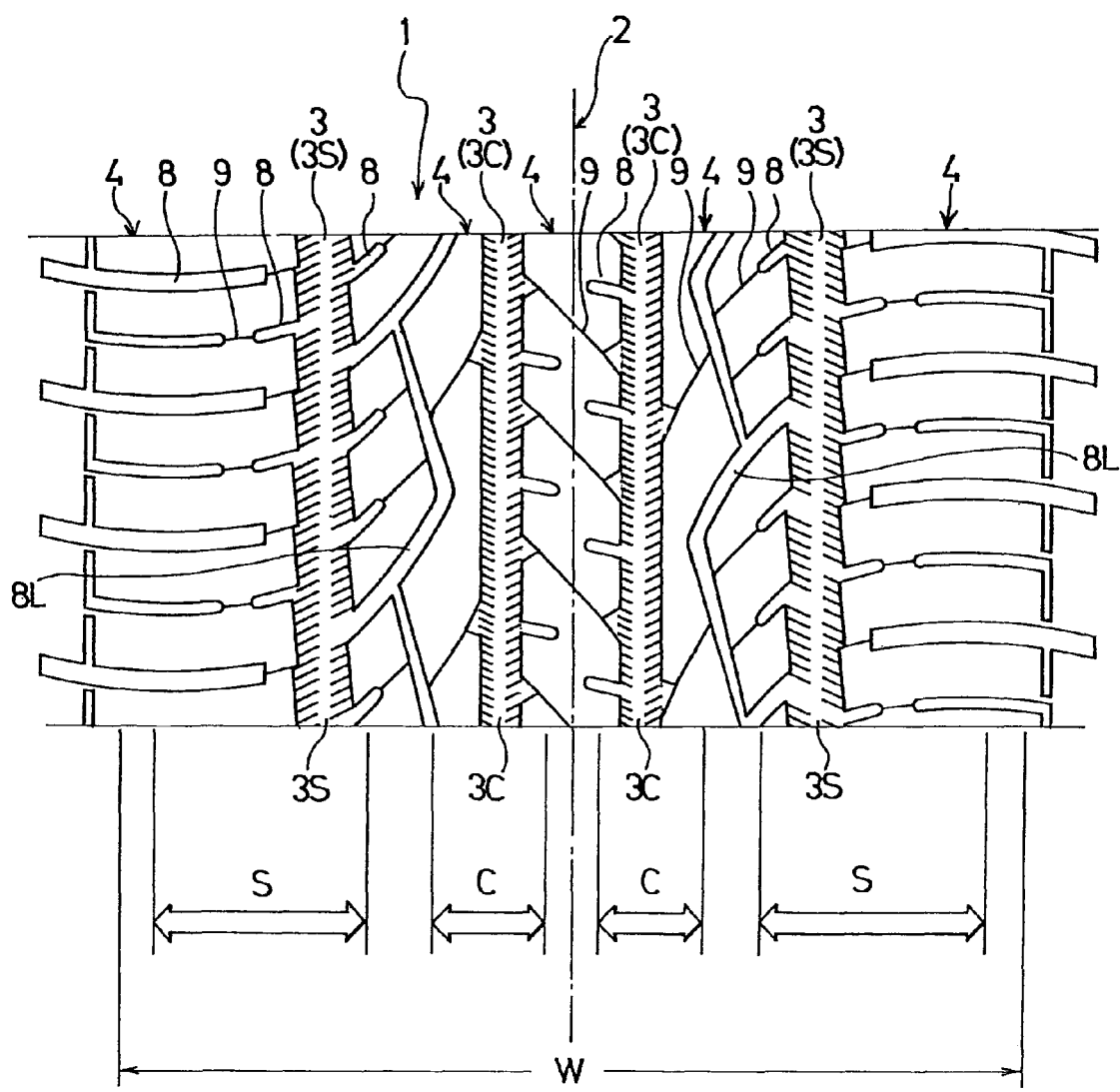
FIG. 1 is a schematic view of a tread surface of a pneumatic tire according to an embodiment of the present invention.
Figure 2:
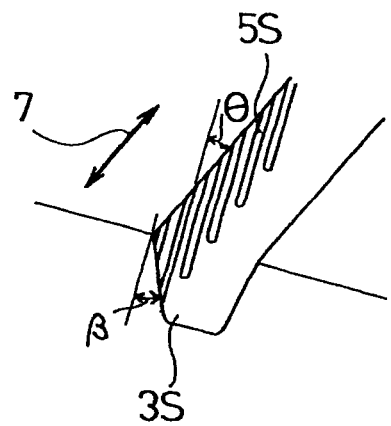
FIG. 2A is a perspective view of a circumferential direction main groove on a tire shoulder side in the pneumatic tire according to the present invention.
FIG. 2B is a plan view thereof.
Figure 2:
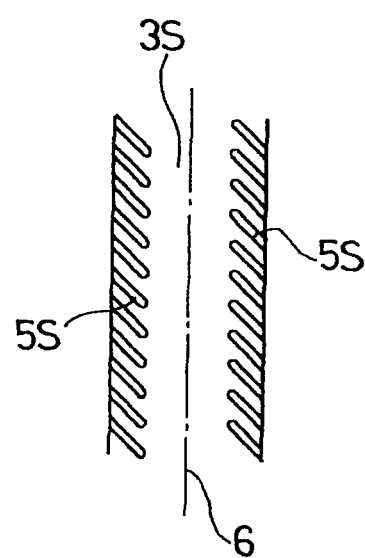

Hereinbelow, a pneumatic tire according to the present invention will be described in detail by referring to the embodiment shown in the drawings.

FIG. 1 shows a tread surface 1 of the pneumatic tire. In each of the right and left sides of a tire center 2, two circumferential direction main grooves 3 (3C and 3S) are provide on the tire center side and tire shoulder side, respectively. Each groove has a see-through structure in a tire circumferential direction. Here, the "see-through structure" refers to a groove structure in which a far side of each of the main grooves 3 in the tread surface 1 can be seen from one side of the groove 3 without being blocked of view by its right and left groove walls when viewed in the tire circumferential direction.

Land portions 4 are defined by the circumferential direction main grooves 3 and are formed as continuous ribs extending in the tire circumferential direction in the example of FIG. 1.

The center land portion 4 between the two circumferential direction main grooves 3C on the tire center 2 side is provided with a large number of lug grooves 8 and sipes 9, which are arranged alternately in an intermittent manner in the circumferential direction. The lug grooves 8 having a short dimension are provided along both edges of the center land portion 4, and one end of each lug groove 8 communicates with the corresponding circumferential direction main groove 3. The sipes 9 extend across the center land portion 4 in a direction inclined to the tire width direction. Short lug grooves 8 and long lug grooves 8L are provided to each land portion 4 between the corresponding circumferential direction main groove 3C on the tire center 2 side and the corresponding circumferential direction main groove 3S on the corresponding shoulder side. The lug grooves 8 and the long lug grooves 8L communicate only with the corresponding circumferential direction main groove 3S on the shoulder side. Each long lug groove 8L is crooked and communicates with another long lug groove 8L adjacent in the circumferential direction to form a wave pattern. The ratio of numbers of the short lug grooves 8 and the long lug grooves 8L is 2 to 1.

In the example of FIG. 1, the land portions 4 are configured as ribs. Instead, each of the land portions 4 may be formed as a block array including a large number of blocks by laying lug grooves across the land portion 4 from one circumferential direction main groove to the other.

The four circumferential direction main grooves 3 (3C, 3S) continuous in the tire circumferential direction are provided, in their respective right and left wall surfaces, with a large number of fine grooves 5 (5C, 5S) being inclined to the tire circumferential direction at an angle of θ as shown in FIG. 2A to FIG. 3B. The shape of the fine grooves 5 is preferably practically a straight line, but may be slightly curved or crooked.

Among the fine grooves 5, the fine grooves 5S provided at right and left wall surfaces of each of the two circumferential direction main grooves 3 on the respective right and left shoulder sides are inclined in the same direction in a plan view in a tire radial direction. Preferably, all of the fine grooves 5S are inclined at the same angle in a plan view in the tire radial direction (see FIG. 2B). Reference numeral 6 denotes a center line of the circumferential direction main groove 3.

Meanwhile, in each of the circumferential direction main grooves 3C on the tire center 2 side, the fine grooves 5C provided in a right wall surface and the fine grooves 5C provided in a left wall surface are inclined in directions opposite from each other in a plan view in the tire radial direction. Preferably, the fine grooves 5C in the right wall and the fine grooves 5C in the left wall are formed symmetric with respect to the center line 6 extending in the tire circumferential direction (see FIG. 3B). Note that, "the plan view in the tire radial direction" means "viewing the tread surface from the outside in the tire radial direction."

Figure 3:
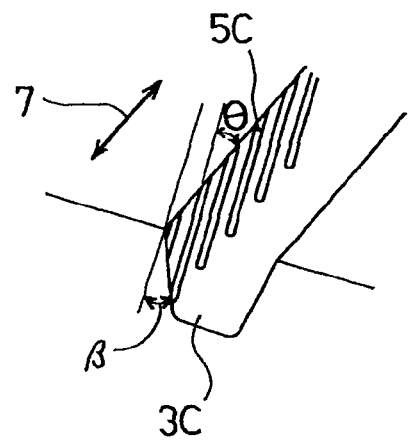
FIG. 3A is a perspective view of a circumferential direction main groove on a tire center side in the pneumatic tire according to the present invention.
FIG. 3B is a plan view thereof.
Figure 3:
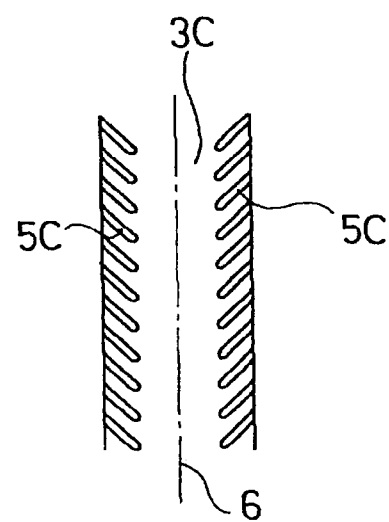

In the arrangement above, the fine grooves 5S and 5C are provided only in the right and left wall surfaces of the circumferential direction main grooves 3S and 3C, respectively, as shown in FIG. 2A to FIG. 3B. Instead, the fine grooves 5 in the right wall surface and those in the left wall surface may be extended to the bottom of the circumferential direction main groove 3 so as to communicate with each other. The direction in which the fine grooves 5S and 5C are inclined to the tire rotational direction is not limited, and may be inclined to the right or left. Moreover, the right side fine grooves 5C and the left side fine grooves 5C may have respective inclined directions so as to come close to each other as shown in FIG. 3B, or conversely, so as to be far apart from each other, at the downstream side of the tire rotational direction.

The fine grooves 5 need to be provided in regions along the circumference direction main groove 3, covering 50% or more of the entire circumference thereof in total. If the fine grooves 5 cover less than 50%, desired effects of the present invention cannot be obtained. Preferably, the fine grooves 5 cover 70% or more, and more preferably, 90% to 100%.

The fine grooves 5 are provided in the two walls of each circumferential direction main groove 3 in a manner as described above. Specifically, in each of the circumferential direction main grooves 3C on the tire center 2 side, the fine grooves 5C in the right surface and those in the left surface extend in directions opposite to each other and inclined to the tire circumferential direction. The fine grooves 5C are thus line-symmetrically arranged. Thereby, the fine grooves 5C can increase reaction force received from snow or mud. This reaction force received by the fine grooves 5C allows the pneumatic tire of the present invention to exhibit high driving performance. On the other hand, in each of the two circumferential direction main grooves 3S of the corresponding tire shoulder side, the fine grooves 5S all extend in the same direction inclined to the tire circumferential direction. Thereby, the fine grooves 5S allow fluids to flow helically in the main grooves 3S. A rectifying effect is thus produced, which increases draining speed of the water, mud and the like on the running surface. Accordingly, the pneumatic tire exhibits high braking performance.

According to the present invention, above effects are combined, and high barking and driving performances can be obtained on snow and mud without increasing the lug groove area. Accordingly, the pneumatic tire of the present invention achieves a good balance between the performances on mud and snow as well as the on-road driving stability which would be deteriorated if the lug groove area were increased.

In the present invention, the inclined angle θ of each fine groove 5 is preferably set to 20° to 70°, more preferably at 35° to 55° in order to effectively produce the effects of the present invention. Each of the fine grooves 5 is preferably a straight line in the present invention, but may be slightly curved or crooked. The inclined angle θ is defined as an inclined angle of the straight line connecting the two ends of each fine groove 5.

The width of each fine groove 5 is preferably 0.2 mm to 0.8 mm, more preferably 0.4 mm to 0.6 mm. An interval between each two adjacent fine grooves 5 is preferably 0.8 mm to 10 mm, more preferably 1 mm to 5 mm. Here, the interval between each two adjacent fine grooves 5 is a distance between side end of one fine groove 5 and side end of the other fine groove 5, measured in the direction orthogonal to the direction of the fine grooves 5.

By setting the inclined angle θ within the range from 20° to 70° as described above, the circumferential direction main grooves 3C on the tire center 2 side can exert an increased reaction force against a tire rotation force. Thereby, traction force and braking force of the tire can be increased. On the other hand, setting the inclined angle θ within the above range allows the circumferential direction main grooves 3S on the respective shoulder sides to produce an improved rectifying effect in which fluids flow helically. Thereby, the braking performance on wet, snowy and muddy road surface is drastically improved.

By setting the width and interval of the fine grooves 5 within the above described respective ranges, the circumferential direction main grooves 3C on the tire center 2 side can contribute to increased traction performance, and the circumferential direction main grooves 3S on the respective shoulder sides can contribute to increased braking performance. A groove width less than 0.2 mm is not preferable since the draining effect by the fine grooves 5 is reduced. A groove width larger than 0.8 mm is also not preferable since the improvement in the traction performance is reduced.

When the width of each fine groove 5 in the main grooves 3S on the respective tire shoulder sides is smaller than 0.2 mm or larger than 0.8 mm, the rectifying effect of the fine grooves 5 is reduced, which in turn lowers the draining effect. Therefore, such configuration is not preferable.

In the present invention, each circumferential direction main groove 3C on the tire center 2 side is preferably located in a way that the center line thereof should be within a region between lines shifted from the tire center 2 respectively by 5% and 15% of the tire contact width on the corresponding side. Moreover, each circumferential direction main groove 3S on the corresponding shoulder side is preferably located in a way that the center line thereof should be within a region between lines shifted from the tire center 2 respectively by 25% and 40% of the tire contact width on the corresponding side. In FIG. 1, the former region is denoted by C, and the latter region is denoted by S. Generally, a center part of the tread surface largely contributes to driving, and shoulder parts of the tread surface largely contribute to braking. Accordingly, by configuring the circumferential direction main grooves 3 on the tire center 2 side and on the shoulder sides as described above, their respective performance can be exhibited more effectively.

Each circumferential direction main groove 3C on the tire center 2 side has a groove width of preferably 3% to 7%, more preferably 4% to 6% of the tire contact width. On the other hand, each circumferential direction main groove 3S on the corresponding shoulder side has a groove width of preferably 100% to 125%, more preferably 115% to 120% of the groove width of each circumferential direction main groove 3C on the tire center 2 side. If the groove widths of the respective circumferential direction main grooves 3C and 3S are too small, less amount of fluids is affected by the fine grooves 5 (5C, 5S), thereby reducing the expected effects of the present invention. On the other hand, if the groove widths are too large, the affection by the fine grooves 5 (5C, 5S) becomes relatively small, thereby also reducing the effects. The rectifying effect in the circumferential direction main grooves 3S on the respective shoulder sides can be improved by setting each of the main grooves 3S to have a large width, such as 115% to 120% of the groove width of each circumferential direction main groove 3C on the tire center 2 side.

The groove walls of each main circumferential direction main groove 3 are inclined to the normal direction of the tread surface 1 at an inclined angle β. The inclined angle β is preferably 5° to 13°, more preferably 7° to 10°. If the inclined angle β of each groove wall to the normal direction of the tread surface 1 is smaller than 5°, block stiffness is reduced, and the effect of the fine grooves 5 is reduced. Meanwhile, if the inclined angle β is larger than 13°, the above rectifying effect is reduced.

The pneumatic tire of the present invention preferably employs a tread surface with a groove area ratio (%) within a certain range which is generally applied to mud and snow tires. Preferably, the groove area ratio is set to 30% to 50%. The groove area ratio of lug grooves 8 should especially be set to 5% to 20%. By reducing the lug groove area ratio, excellent rib stiffness and block stiffness can be secured. Thereby, the on-road driving stability can be improved even more.

Here, the "groove area ratio of the tread surface (%)" is a proportion of an area which is actually not in contact with the ground to the contact area in the contact surface. Moreover, the "groove area ratio of lug grooves (%)" is a proportion of a total area of the lug grooves 8 to an area of each of the land portions 4 defined by the circumferential direction main grooves 3 (including lug groove portions). The groove area ratio of lug grooves is obtained by excluding the total area of the circumferential direction main grooves 3 in the above groove area ratio of the tread surface.

Note that, the tire contact width mentioned in the present invention is a contact width measured in a tire axial direction when the tire is inflated to an air pressure, and then applied a load of 80% of the maximum load capacity of the tire. The air pressure applied here is selected from the air pressure-load capacity correspondence table specified by JATMA, as one that corresponds to the maximum load capacity of the tire. Moreover, the contact surface is a region surrounded by the contacting outer edges when the tire is applied the above described load.

EXAMPLES

Eight types of pneumatic tires (Conventional Example, Comparative Example, Examples 1 to 6) were prepared which commonly had a tire size of P265/70R17 113S and a tread pattern of FIG. 1 as a basic pattern. In addition, these tires were made different from one another in the position, width, and angle of each circumferential direction main groove, whether or not fine grooves were formed, as well as the form and arrangement of the fine grooves. The fine grooves in Examples 1 to 6 were inclined as shown in FIG. 1. The fine grooves in Comparative Example were inclined only in the same direction. No fine grooves were formed in Conventional Example. In all the examples, the fine grooves were provided in regions along each circumferential direction main groove, covering 100% of the entire circumference thereof.

Each of the eight types of tires was fitted onto a rim with size of 17×8 J (measuring rim) and inflated to an air pressure of 200 kPa. Then, the tire was mounted on a four-wheel-drive RV wagon, and running tests described below were performed on the tire running on the test course.

Table 1 and Table 2 show the results of the tests. The pneumatic tires of the present invention showed excellent braking and driving performance in running under wet and snowy condition. In addition, the tires showed excellent on-road driving stability performance, which cannot be observed in conventional pneumatic tires designed for the same purpose.

(1) Wet Braking Ability

A braking distance from an initial speed of 100 km/h was measured for each tire on the wet test course. The braking distances are indicated by indices where the distance of Conventional Example is normalized to 100. The larger the index is, the more excellent the tire is in wet braking ability.

(2) Braking Ability on Snow

A braking distance from an initial speed of 40 km/h was measured for each tire on the snowy test course. The braking distances are indicated by indices where the distance of Conventional Example is normalized to 100. The larger the index is, the more excellent the tire is in braking ability on snow.

(3) Driving Ability on Snow

A frictional coefficient between the tire and the road surface at speed of 5 km/h was measured for each tire on the snowy test course. The frictional coefficients are indicated by indices where the frictional coefficient of Conventional Example is normalized to 100. The larger the index is, the more excellent the tire is in driving ability on snow.

(4) On-Road Driving Stability

On-Road running was performed using each tire. The results are indicated by indices where the performance of Conventional Example is normalized to 100. The larger the index is, the more excellent the performance of the tire is.

TABLE 1

| | | Conventional Example | Comparative Example | Example 1 | Example 2 | Example 3 |
|---|---|---|---|---|---|---|
| Presence or absence of fine groove | | Absent | Present | Present | Present | Present |
| Inclined angle of fine groove θ (degree) | | — | 20 | 20 | 70 | 45 |
| Width of fine groove (mm) | | — | 0.2 | 0.2 | 0.8 | 0.5 |
| Interval between fine grooves (mm) | | — | 0.8 | 0.8 | 10 | 1.5 |
| Position of center line of circumferential direction main groove (position from tire center) | Center side | 8% of tire contact width | 8% of tire contact width | 8% of tire contact width | Same to the left | Same to the left |
| | Shoulder side | 45% of tire contact width | 45% of tire contact width | 45% of tire contact width | Same to the left | Same to the left |
| Width of circumferential direction main groove | Center side | 7% of tire contact width | 7% of tire contact width | 7% of tire contact width | Same to the left | Same to the left |
| | Shoulder side | 100% of center side main groove | 100% of center side main groove | 100% of center side main groove | Same to the left | Same to the left |
| Inclined angle β of side wall of circumferential direction main groove | | 5 | 5 | 5 | Same to the left | Same to the left |
| Groove area ratio of tread surface (%) | | 35 | 25 | 35 | 35 | 35 |
| Groove area ratio of lug groove (%) | | 10 | 4 | 10 | 10 | 10 |
| Wet braking ability | | 100 | 102 | 103 | Same to the left | 105 |
| Braking ability on snow | | 100 | 92 | 103 | Same to the left | 105 |
| Driving ability on snow | | 100 | 92 | 103 | Same to the left | 105 |
| On-road driving Stability | | 100 | 102 | 100 | 100 | 100 |

TABLE 2

| | | Example 4 | Example 5 | Example 6 |
|---|---|---|---|---|
| Presence or absence of fine groove | | Present | Present | Present |
| Inclined angle of fine groove θ (degree) | | 45 | Same to the left | Same to the left |
| Width of fine groove (mm) | | 0.5 | Same to the left | Same to the left |
| Interval between fine grooves (mm) | | 1.5 | Same to the left | Same to the left |
| Position of center line of circumferential direction main groove (position from tire center) | Center side | 20% of tire contact width | Same to the left | Same to the left |
| | Shoulder side | 65% of tire contact width | Same to the left | Same to the left |
| Width of circumferential | Center side | 7% of tire contact width | 5% of tire contact width | Same to the left |

TABLE 2-continued

|  |  | Example 4 | Example 5 | Example 6 |
|---|---|---|---|---|
| direction main groove | Shoulder side | 100% of center side main groove | 100% of center side main groove | 120% of center side main groove |
| Inclined angle β of side wall of circumferential direction main groove |  | 5 | Same to the left | 10 |
| Groove area ratio of tread surface (%) |  | 35 | 35 | 35 |
| Groove area ratio of lug groove (%) |  | 10 | 10 | 10 |
| Wet braking ability |  | 107 | 109 | 110 |
| Braking ability on snow |  | 107 | 109 | 110 |
| Driving ability on snow |  | 106 | 108 | 110 |
| On-road driving Stability |  | 100 | 101 | 102 |

What is claimed is:

1. A pneumatic tire having a tread surface in which two circumferential direction main grooves continuous in a tire circumferential direction are arranged on each of left and right sides of a tire center, and land portions are defined by the circumferential direction main grooves as ribs or blocks having lug grooves, wherein
a plurality of fine grooves are provided only in each of right and left walls of each of the circumferential direction main grooves, the fine grooves being inclined in a radial direction to the tire circumferential direction at an angle of 20° to 70°, the fine grooves being provided in regions along the circumferential direction main groove, covering at least 50% of the entire circumference thereof in total,
in each of the two circumferential direction main grooves on tire shoulder sides, the fine grooves in the right wall and the fine grooves in the left wall are inclined to the tire circumferential direction in the same direction in a plan view in a tire radial direction, and
in each of the two circumferential direction main grooves on a tire center side, the fine grooves in the right wall and the fine grooves in the left wall are inclined to the tire circumferential direction in directions opposite to each other in a plan view in the tire radial direction,
wherein the fine grooves extend from the tread surface toward the bottom of the circumferential direction main grooves;
groove walls of each circumferential direction main groove are inclined to a normal direction of the tread surface at an angle of 7° to 13°, and
wherein each of said circumferential direction main grooves has a see through structure.

2. The pneumatic tire according to claim 1, wherein
a width of each of the fine grooves is set to 0.4 mm to 0.6 mm, and
an interval between each adjacent two of the fine grooves is set to 1 mm to 5 mm.

3. The pneumatic tire according to claim 2, wherein the inclined angle of each fine groove to the tire circumferential direction is set to 35° to 55°.

4. The pneumatic tire according to claim 1, wherein
each center line of a circumferential direction main groove on the tire center side is located in a region between lines shifted from the tire center respectively by 5% and 15% of a tire contact width on the corresponding side, and
each center line of a circumferential direction main groove on the corresponding shoulder side is located in a region between lines shifted from the tire center respectively by 25% and 40% of the tire contact width on the corresponding side.

5. The pneumatic tire according to claim 1, wherein
each circumferential direction main groove on the tire center side has a groove width set to 4% to 6% of the tire contact width, and
each circumferential direction main groove on the corresponding shoulder side has a groove width set to 115% to 125% of the groove width of each circumferential direction main groove on the tire center side.

6. The pneumatic tire according to claim 1, wherein a groove area ratio in the tread surface is 30% to 50%.

7. The pneumatic tire according to claim 1, wherein a groove area ratio of the lug grooves in the tread surface is 5% to 20%.

8. The pneumatic tire according to claim 1, wherein
in each of the two circumferential direction main grooves on the tire shoulder sides, the fine grooves in the right wall and the fine grooves in the left wall have the same inclined angle in a plan view in the tire radial direction, and
in each of the two circumferential direction main grooves on the tire center side, the fine grooves in the right wall and the fine grooves in the left wall have different inclined directions line-symmetric with respect to a main groove center line in a plan view in the tire radial direction.

9. The pneumatic tire according to claim 1, wherein the pneumatic tire is a mud and snow tire.

* * * * *